P. ARTIGUE.
MEANS FOR PRODUCING ANIMATED SHADOWGRAPHS.
APPLICATION FILED AUG. 23, 1915.
1,263,355.  Patented Apr. 16, 1918.
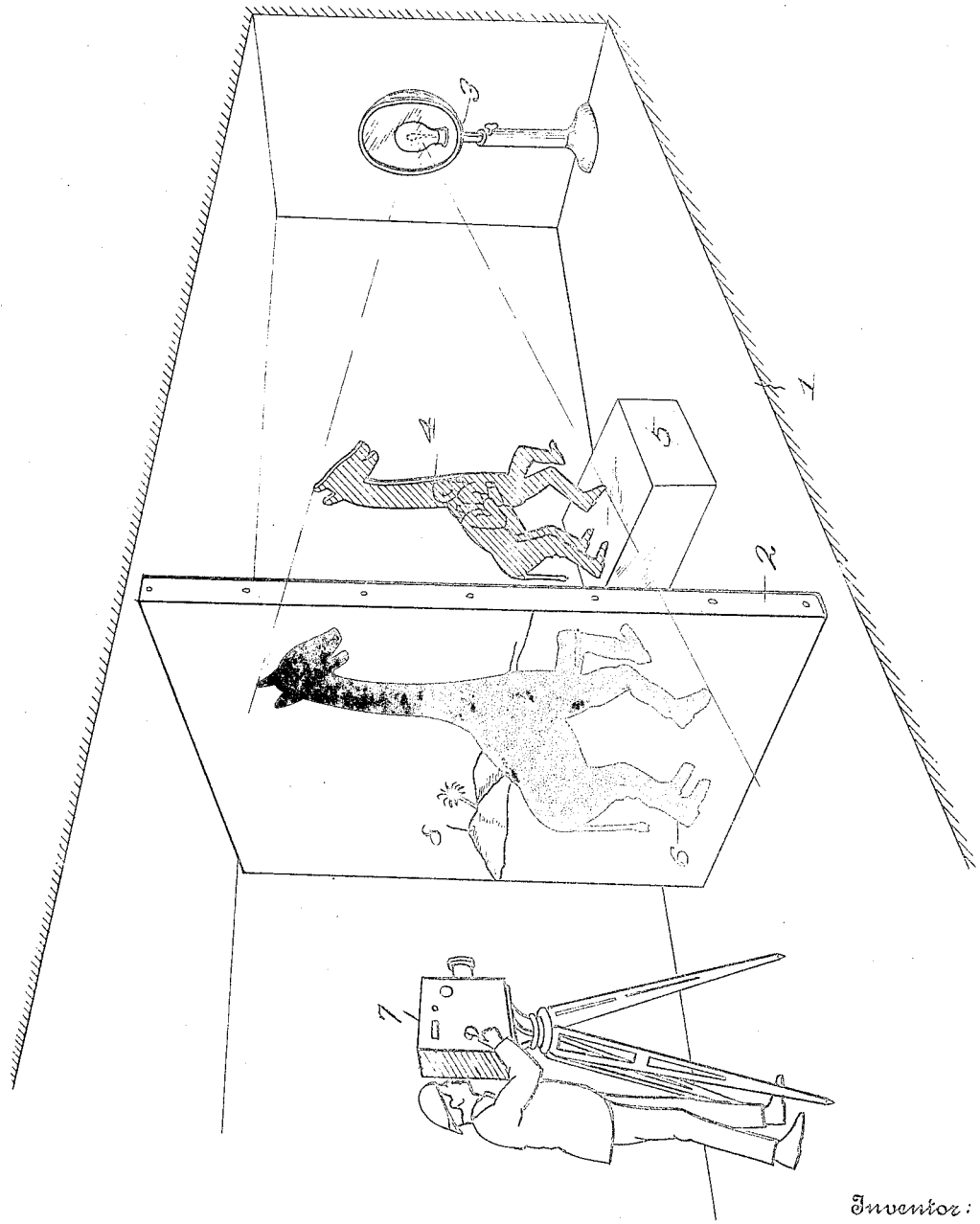

UNITED STATES PATENT OFFICE.

PIERRE ARTIGUE, OF KANSAS CITY, MISSOURI.

MEANS FOR PRODUCING ANIMATED SHADOWGRAPHS.

1,263,355.  Specification of Letters Patent.  Patented Apr. 16, 1918.

Application filed August 28, 1915. Serial No. 48,330.

*To all whom it may concern:*

Be it known that I, PIERRE ARTIGUE, a citizen of the United States, residing at Kansas City, in the county of Jackson and State of Missouri, have invented certain new and useful Improvements in Means for Producing Animated Shadowgraphs, of which the following is a specification.

My invention relates to a process of and articles for producing animated shadowgraphs, and my object is to produce moving pictures of this character which can be produced commercially at considerably less expense, time and labor than the well-known animated cartoons that require the services of an artist and the making of hundreds of drawings, in the production of a simple scenario.

An important part of my invention resides in projecting shadows of persons, animals, or other objects on a suitable screen and then photographing said shadows while in motion with a moving picture camera, the exposures being made on a sensitized film with such rapidity that each successive picture shows the object in a slightly advanced position over that assumed in the preceding picture. The resulting film is then used in a projector, which casts the pictures upon a screen in view of an audience in the usual manner. The screen on which the shadowgraphs are originally produced has, preferably, painted or otherwise produced thereon a suitable background of trees, buildings, or other inanimate bodies.

As the moving objects are in silhouette they conceal the underlying portions of the background, so that said underlying portions will not show through the solid black of the silhouette as it is projected on the screen.

In the accompanying drawing which illustrates a simple form of carrying out my invention, 1 designates a room which is preferably closed to outside light in order to obtain shadowgraphs of distinct outline. Said shadowgraphs can be produced by either animate or inanimate objects interposed between the screen 2 and a suitable source of light, such for instance, as a lamp 3.

The object 4 in the present instance is represented as an animated one mounted upon a transparent platform 5, so that the rays of light passing below and around the object's feet will clearly outline the same on the screen 2.

The screen 2 may have a reflecting surface, so that the shadowgraph cast thereon can be photographed with a moving picture camera adjacent the lamp 3, or said screen may be of translucent or transparent material, so that the shadowgraph 6, will show therethrough with sufficient distinctness to be photographed with a camera 7, stationed at the opposite side of the screen from that on which the object 4 is located.

The distance from the lamp 3, the object 4 and the screen 2 will determine the size of the shadowgraphs projected on said screen. A suitable background 8 may be painted or otherwise produced on the screen 2 to accord with the character of the shadowgraphs produced, and as the latter are solid black or substantially so, they will conceal the underlying portion of said background.

By employing skilful actors and more or less paraphernalia, it is obvious that interesting and amusing pictures may be quickly and economically produced for commercial purposes by my process.

Having thus described my invention, what I claim and desire to secure by Letters Patent, is:

1. A screen for animated shadowgraphs having scenery extending across the shadowgraph-receiving portion of the screen, said scenery being of such a character as to be concealed by the shadowgraph when projected thereon so as to uninterrupt the unity of the projected shadowgraph, and means for photographing the screen with the shadowgraph thereon.

2. In combination with a screen for animated shadowgraphs having scenery extending across the shadowgraph-receiving portion of the screen, said scenery being of such a character as to be concealed by the shadowgraph when projected thereon so as to uninterrupt the unity of the projected shadowgraph, of a support for the animated object, said support being transparent to the source of projecting light whereby the same will not be projected in the shadowgraph.

In testimony whereof I affix my signature, in the presence of two witnesses.

PIERRE ARTIGUE.

Witnesses:
F. G. FISCHER,
L. J. FISCHER.